United States Patent
Anderson

[15] 3,701,203
[45] Oct. 31, 1972

[54] PARTICULATE MATERIAL DRYING APPARATUS

[72] Inventor: Robert J. Anderson, Toledo, Ohio

[73] Assignee: The Andersons, Maumee, Ohio

[22] Filed: Nov. 22, 1971

[21] Appl. No.: 201,092

Related U.S. Application Data

[62] Division of Ser. No. 856,009, Sept. 8, 1969, Pat. No. 3,645,006.

[52] U.S. Cl..........................................34/170, 34/13
[51] Int. Cl. ..........................F26b 7/00, F26b 17/12
[58] Field of Search..........34/13, 170, 168, 169, 164, 34/64; 165/106

[56] References Cited

UNITED STATES PATENTS

| | | | |
|---|---|---|---|
| 3,373,503 | 3/1968 | Kline | 34/170 |
| 3,302,297 | 2/1967 | Graham | 34/13 |
| 3,300,873 | 1/1967 | Bussell et al. | 34/170 |
| 3,257,733 | 6/1966 | Ives et al. | 34/170 |
| 3,006,609 | 10/1961 | Anthony | 165/106 |
| 2,706,343 | 4/1955 | Oholm | 34/13 |
| 2,701,920 | 2/1955 | Campell | 34/170 |
| 2,636,575 | 4/1953 | Watson | 34/13 |
| 2,073,553 | 3/1937 | Dienst | 34/170 |
| 1,058,291 | 4/1913 | Dennis | 34/13 |

Primary Examiner—Kenneth W. Sprague
Assistant Examiner—James C. Yeung
Attorney—Freeman Crampton

[57] ABSTRACT

An apparatus for drying particulate material, particularly that which like grain, has a critical degree of heat tolerance, while the material forms and moves through a bed of material, utilizing a heated dry gaseous medium and passing the same to and in direct contact with the bed forming and traversing material.

23 Claims, 16 Drawing Figures

PARTICULATE MATERIAL DRYING APPARATUS

This application is a division of application Ser. No. 856,009 filed Sept. 8, 1969 for a Particulate Material Drying Apparatus and Method that issued Feb. 29, 1972 as U.S. Pat. No. 3,645,006.

BACKGROUND OF INVENTION

1. The Field of Invention

An apparatus in and by which one end, preferably the inflowing end, of a bed of particulate material through which such material is substantially continuously moving from end to end is subject to a heated dry gaseous medium moving inwardly of the bed and in the same direction as material movement therethrough to effect direct contact between the medium and the particles of the material and thereby to raise the temperature of the particles, to withdraw moisture therefrom and to convey such moisture out of the bed.

2. Description of the Prior Art

Direct contact between undried particulate material in a continuously end to end flowing bed and a dry heated gaseous medium moving inwardly thereof and in common direction with particle movement therethrough to effect drying thereof has been known. These are the teachings in U.S. Pat. Nos. 1,100,397 to Reynolds; No. 2,706,343 to Oholm and No. 3,302,297 to Graham. In these and most prior equipments, particle movement is accomplished by gravity, the gaseous medium being introduced to the material either through laterally spaced orifices in ducts extending through and into the material at the material inflowing end of the bed, as in Reynolds and Graham, or through space above the upper charging end of the bed, as in Oholm.

The former arrangement produces a plurality of individual, laterally spaced, usually vertical streams of the hot gaseous medium to zones in the bed immediately below the ducts. The particulate material flowing between and around the ducts causes voids to be formed in these bed zones beneath the ducts. The lower boundary of each void comprises a V-shaped superficies area surface of the particulate material forming the bed below the ducts and it is these area surfaces and the particulate material that forms them which is exposed to the streams of flowing hot gaseous medium. A significant portion of the particulate material entering and forming the bed flows, however, between the ducts and not being exposed to direct contact with the flowing hot gaseous medium, remains relatively cool and gives up relatively little moisture. Furthermore, even among the particulate materials forming the V-shaped superficies boundary or surface areas of the voids and thus directly exposed to the streams of flowing hot gaseous medium, the length of time of direct exposure to the hot gaseous medium varies. A particle of the particulate material which flows halfway down the V slope before being buried in the bed has half the direct exposure time experienced by a particle which flows from the top to the bottom of the V slope before being buried in the bed. Thus, the particulate material, after a pass through the bed, will include some portions that have been in direct exposure with the flowing hot gaseous medium for various periods of time and some portions that have only been in an indirect exposure thereto and that to a greater or lesser extent. Some particles, therefore, will remain relatively cool and will have given up little or no moisture and others will be heated to high temperatures and be devoid of even desirable inherent moisture.

The latter arrangement, of which Oholm is characteristic, has much the same just mentioned disadvantage, in necessarily developing and presenting a V shaped, however here inverted, superficies boundary or surface area of the bedded material exposed to the entering hot gaseous medium. The development of such V shaped superficies area of the bed in Oholm is in consequence of the fact that charging of the bed is accomplished by the material falling free, from a feed spout, into a pile having sloping conical sides. Thus, the length of time that individual particles are exposed directly to the hot gaseous medium by being a part of the Oholm bed superficies area will vary, according to the particle position on the pile, those embedded near the peak of the pile being exposed for a shorter period than those embedded on the slope sides.

In prior practice, therefore, in order to arrive at some practical acceptable average moisture reduction for most of the material flowing through the bed, the time-temperature conditions to which a significant portion of the particulate materials are subject, as they flow through the bed, are made to exceed the tolerance of those particles and some become severly damaged. This is particularly true in drying grain where evidence of such damage is significant puffing or discoloration of the grain and the tendency of it to fracture on light impact. Such damage materially lowers the value of the entire product.

SUMMARY OF THE INVENTION

The invention resides in an apparatus to which particulate material to be dried is continuously brought for drying, over a period of normal operations, then dried and thereafter continuously withdrawn.

The essential components of the apparatus invention herein comprises means to apply a heated dry gaseous medium under pressure and uniformly, to the entire area of the inflowing end of a continuously end to end flowing bed of particulate material to be dried, together with means by which particulate material to be dried may be periodically introduced to the bed and evenly spread over the entire area of the inflowing end of the bed, as in successive flat layers, without exposing the particulate material being added to the heated dry gaseous medium until the particulate material being added has been deposited on the bed.

DESCRIPTION OF PREFERRED EMBODIMENT OF APPARATUS

The invention concerns material drying in what may be called a "continuous" production or "flow" type operation, in which particles of the material being dried are continuously introduced to, passed through and, as drier material, withdrawn from a confined space. The material particles within the confined space, though moving from the point of introduction to the point of discharge, are of such congestion that they form a "bed." Most usually, the introducing and discharging points are so related that the movement of the material particles through the confined space and bed is responsive to and produced by gravity. Thus, the particulate material to be dried is introduced to the bed at its upper inflowing end and the drier particulate material withdrawn from the bed at its lower outflowing end.

Figures 1, 16:
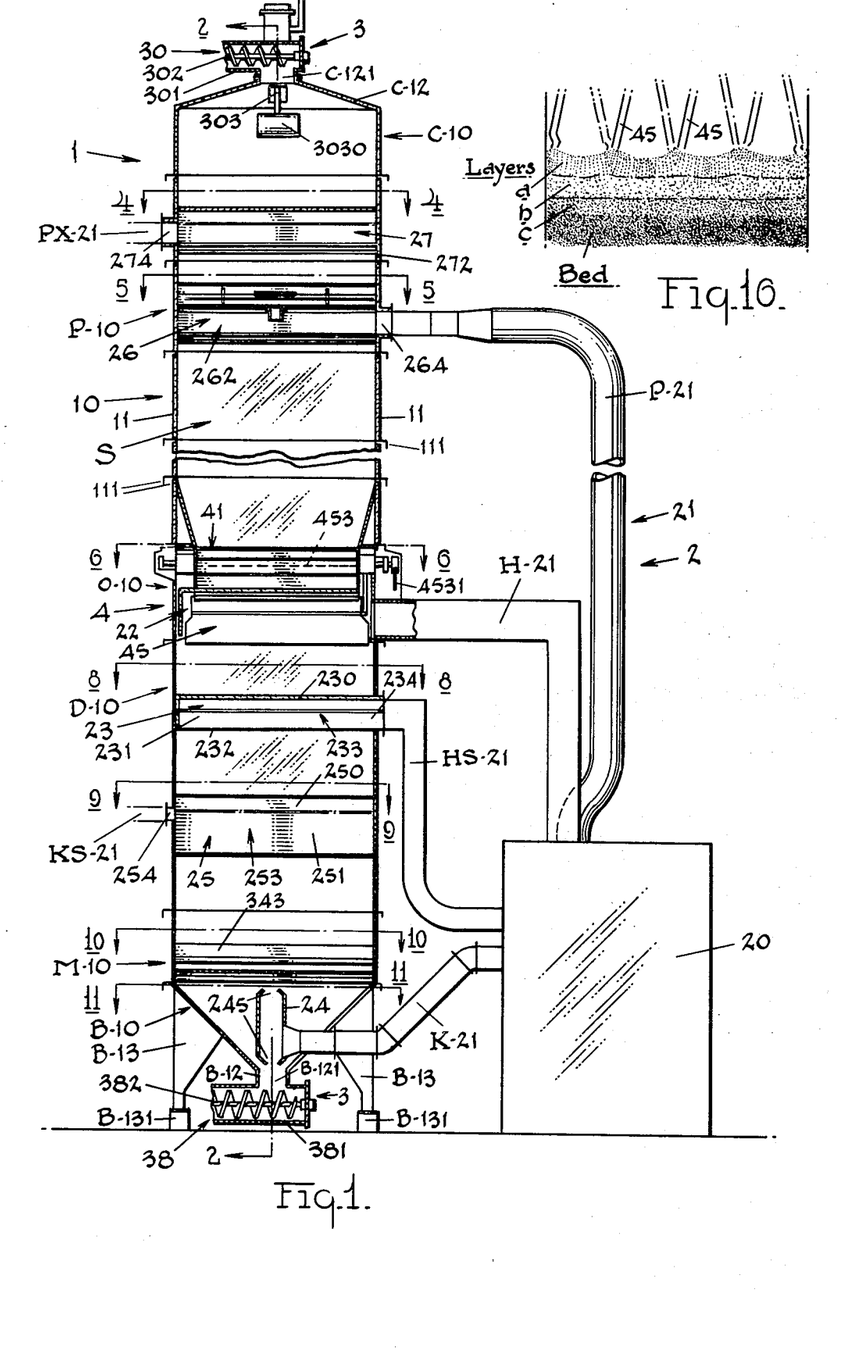
FIG. 1 illustrates, somewhat diagrammatically, a longitudinal section of a particulate material drying apparatus embodying my invention, which embodiment now appears to me to be the best mode by which my invention in an apparatus may be carried out.
FIG. 16 illustrates, diagrammatically, an enlarged longitudinal section of the "Bed," indicated in FIG. 3, at the upper end of the "Drying Zone," also indicated in FIG. 3.
Figure 2:
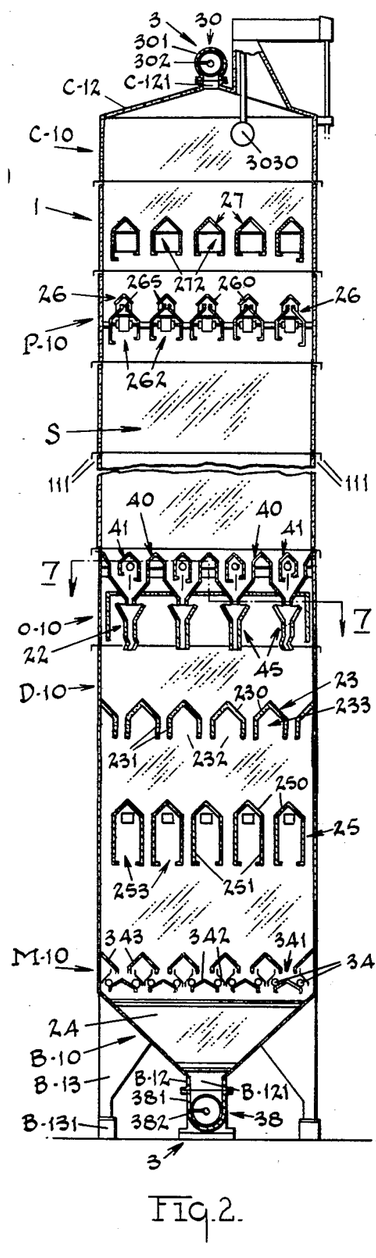
FIG. 2 illustrates, also in part diagrammatically, a longitudinal section of the apparatus shown in FIG. 1, viewed from a point ninety degrees about the longitudinal axis from the point of view of FIG. 1.

To provide a confined space of this character, I contemplate a container, such as a stack, silo, or tower 1 illustrated in FIGS. 1 and 2 of the accompanying drawings. The tower 1 is designed to be served by a gaseous medium conducting means 2, by a material handling means 3 and by a material orientation means 4.

The gaseous medium conducting means 2 includes elements by which gaseous medium is caused to flow in, through and out of the tower 1 and, in the course of which flow, to pass in a moisture exchange relation with particulate material within the tower.

The material handling means 3 include elements by which material to be dried or treated is brought into the tower 1, is controlled as to outflow from the tower and is carried away from the tower.

The material orientation means 4 include elements within the tower 1 by which particulate material within the tower is collected at one zone within the tower, conducted through the tower to another zone in the tower and there advantageously redistributed. In the inclusion and structure of such orientation means, resides critical elements of my invention and teachings.

THE TOWER

The tower 1 may be formed of sheet metal in a number of several ways, not particularly critical to my invention, to provide sidewalls, cap and bottom walls and a supporting structure therefor. In the form shown in the drawings, particularly FIGS. 1 and 2 thereof, the tower 1 comprises a plurality of sheet metal annular and substantially quadrilateral modules 10 arranged in a stacked relation along and about a vertically extending central axis. Certain of such modules are illustrated in some detail in FIGS. 4, 5, 6, 8, 9 and 10 of the drawings. From these illustrations, it will be seen that each module 10 has an outer sheet metal annular wall 11 whose upper and lower end edges are, in most instances, provided with collar flanges 111. The collar flanges 111 of each module are designed to engage and be connected to the corresponding collar flanges 111 of the next adjacent upper or lower module. Thus, the modules 10 are integrated into a single hollow upstanding column.

Figure 3:
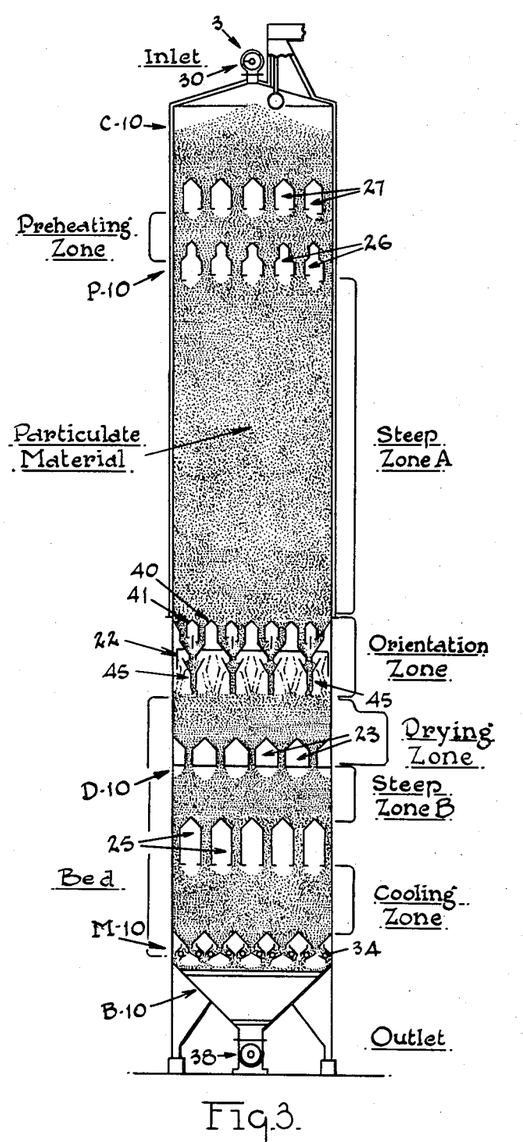
FIG. 3 diagrammatically illustrates operating conditions that prevail in the apparatus shown in FIG. 2.
Figure 4:
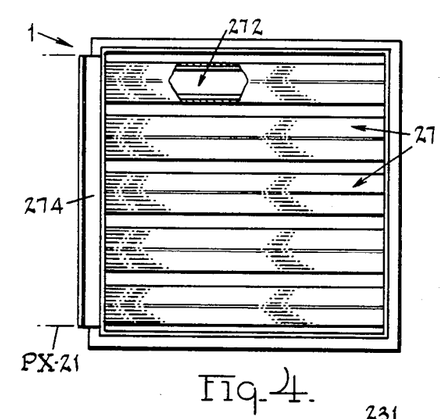
FIG. 4 illustrates a view of a section taken along the plane of the line 4—4 indicated in FIG. 1.
Figure 5:
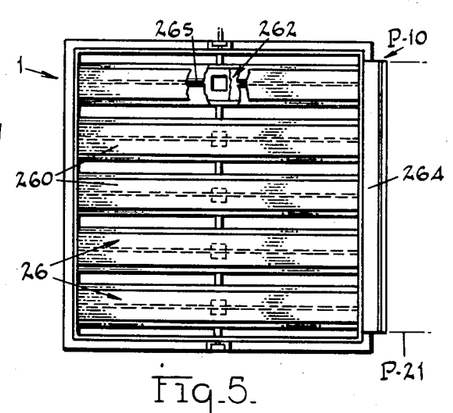
FIG. 5 illustrates a view of a section taken along the plane of the line 5—5 indicated in FIG. 1.
Figure 6:
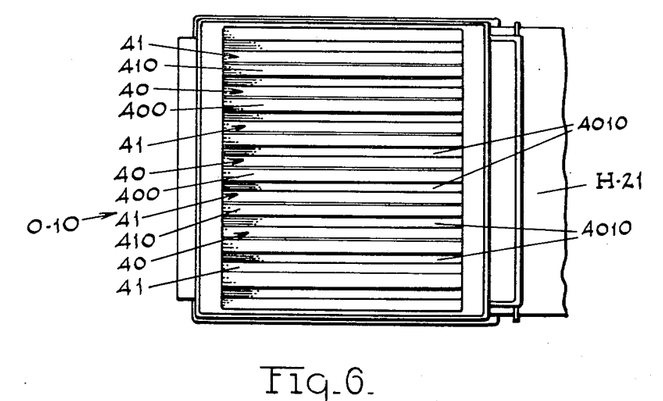
FIG. 6 illustrates a view of a section taken along the plane of the line 6—6 indicated in FIG. 1.
Figure 7:
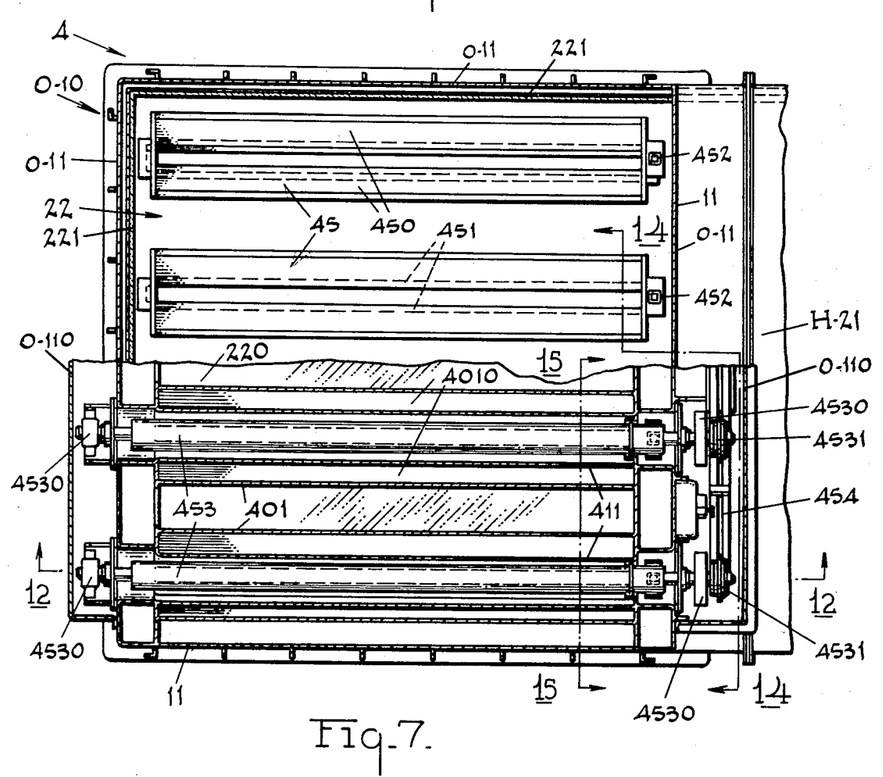
FIG. 7 illustrates an enlarged view of a section taken along the plane of the line 7—7 indicated in FIG. 2.

At the uppermost end of the stacked modules 10 is a top or cap providing module C–10. The cap module C–10 has (see FIGS. 1 and 2), in place of the mentioned upper collar flange 111, a somewhat conical, radially extending wall C–12. The wall C–12 has an inlet opening C–121, adapted to communicate with elements of the material handling means 3 that transport particulate material to be treated to a material release point above the opening C–121. Hence, material so transported and released may fall freely through the opening C–121 (see FIG. 3 of the drawings) into the tower 1.

At the lowermost end of the stacked modules 10, I provide a hopper module B–10 (see FIGS. 1 and 11 of the accompanying drawings) which acts to close the lower end of the tower 1. Module B–10 has, at its lower edge, in place of the previously mentioned collar flange, a radially extending, throat forming wall B–12 in which an opening B–121 is formed. The opening B–121 is adapted to communicate with other elements of the material handling means 3 that transport material away from the tower. Hence, particulate material, that has passed through the space within the tower 1, may fall through opening B–121 and be conveyed away.

Figure 11:
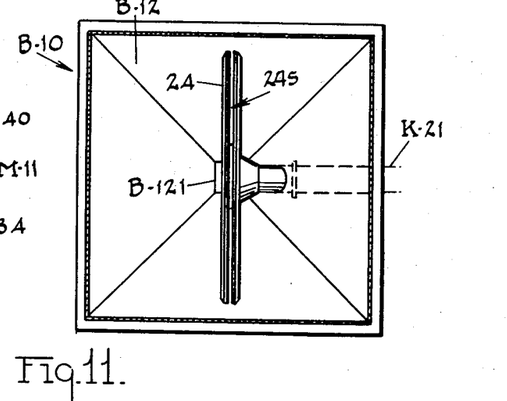
FIG. 11 illustrates a view of a section taken along the plane of the line 11—11 indicated in FIG. 1.

The hopper providing module B–10 may also have exterior legs B–13 that, through thereto connected feet B–131, support the tower 1 in its illustrated and described upright condition. The stacked modules 10, together with cap providing module C–10 and the hopper providing module B–10, substantially enclose a confined space S within the tower 1. It is to this confined space S that the medium (gaseous) for drying (treating) and the particulate material (grain) are brought to effect an exchange (moisture/heat) to produce drier (treated) material.

THE GASEOUS MEDIUM CONDUCTING MEANS

The gaseous medium conducting means 2 may be formed by a system of conduits connected to the tower 1 and to various power driven pumps and may thus conduct hot and cool airs to within and exhaust such airs from the tower 1 to produce (see FIG. 3 of the accompanying drawings) a "Drying Zone" and a "Cooling Zone."

Those skilled in the art are aware that, in a gravity actuated, continuous flow type drier operation, arrangements are sought to be made by which the introduced hot airs, normally tending to rise in the tower 1, are, by artificially induced drafts and baffling, caused to move downwardly in the tower, along with the gravity induced movement of particulate material being dried. This is customarily accomplished through the suitable disposition of injectors and exhausts in the tower and a pragmatic selection and exertion through such injectors and exhausts of positive and negative gas input and withdrawal pressure.

As shown in FIG. 1 of the accompanying drawings, the gaseous medium conducting means 2 includes an engine/pump house 20 from and to which flues 21 extend. Not shown but well known in the art, the engine/pump house 20 encloses, among other equipment, a power operated air pump, an air intake and heater which are operatively associated to cause heated air to flow through flue H–21 into the tower 1, downwardly therein and to return from the tower, as spent heated air, through flue HS–21. Also within the engine/pump house 20 (but not shown, being likewise well known) there is another power operated air pump and air intake which are operatively associated to cause cool or atmosphere air to flow through flue K–21 into the tower 1, particularly into module B–10 thereof, and to move upwardly in the tower to exhaust to the atmosphere through discharge stack or flue KS–21.

Figure 12:
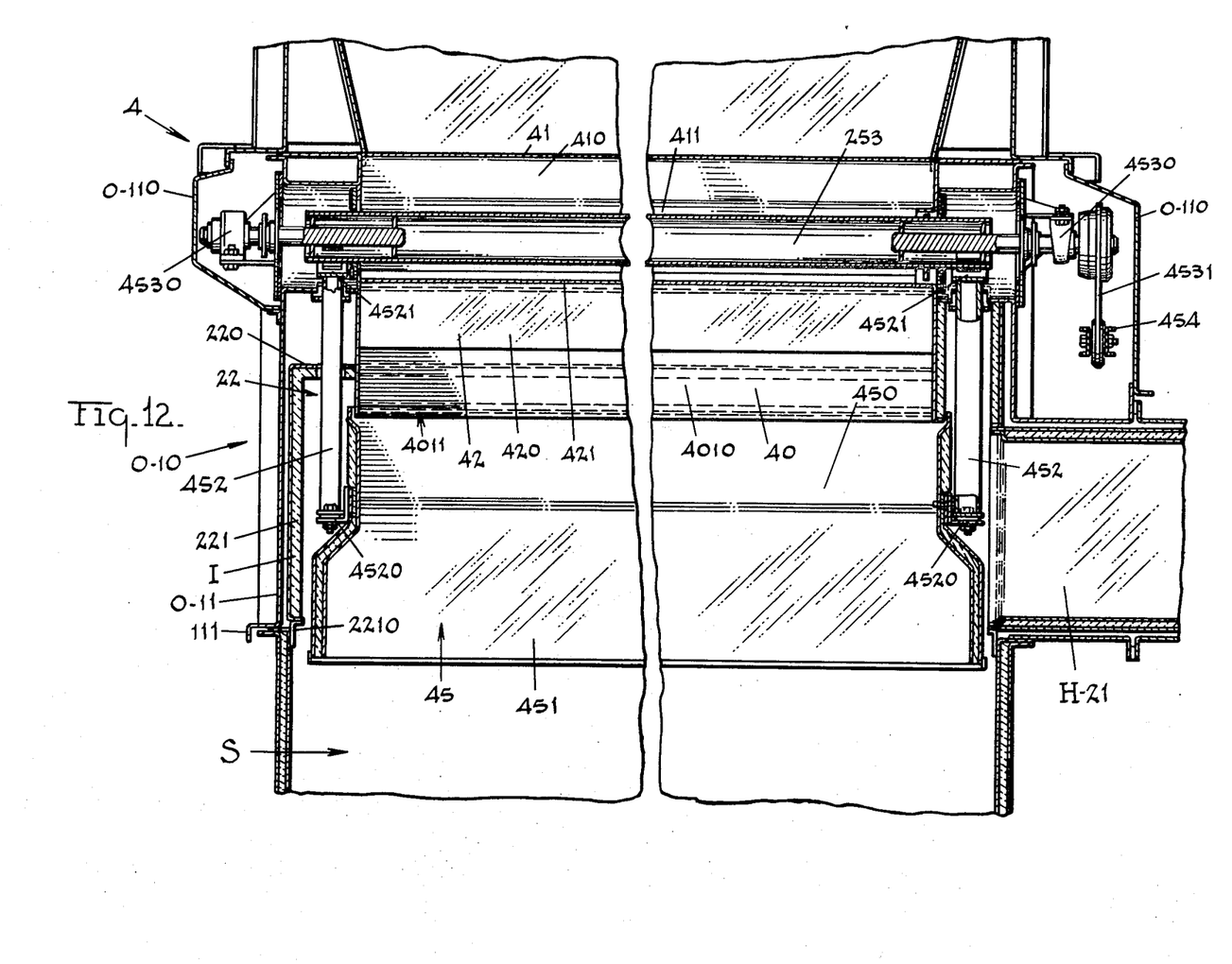
FIG. 12 illustrates an enlarged view of a section taken along the plane of the line 12—12 indicated in FIG. 7.
Figure 13:
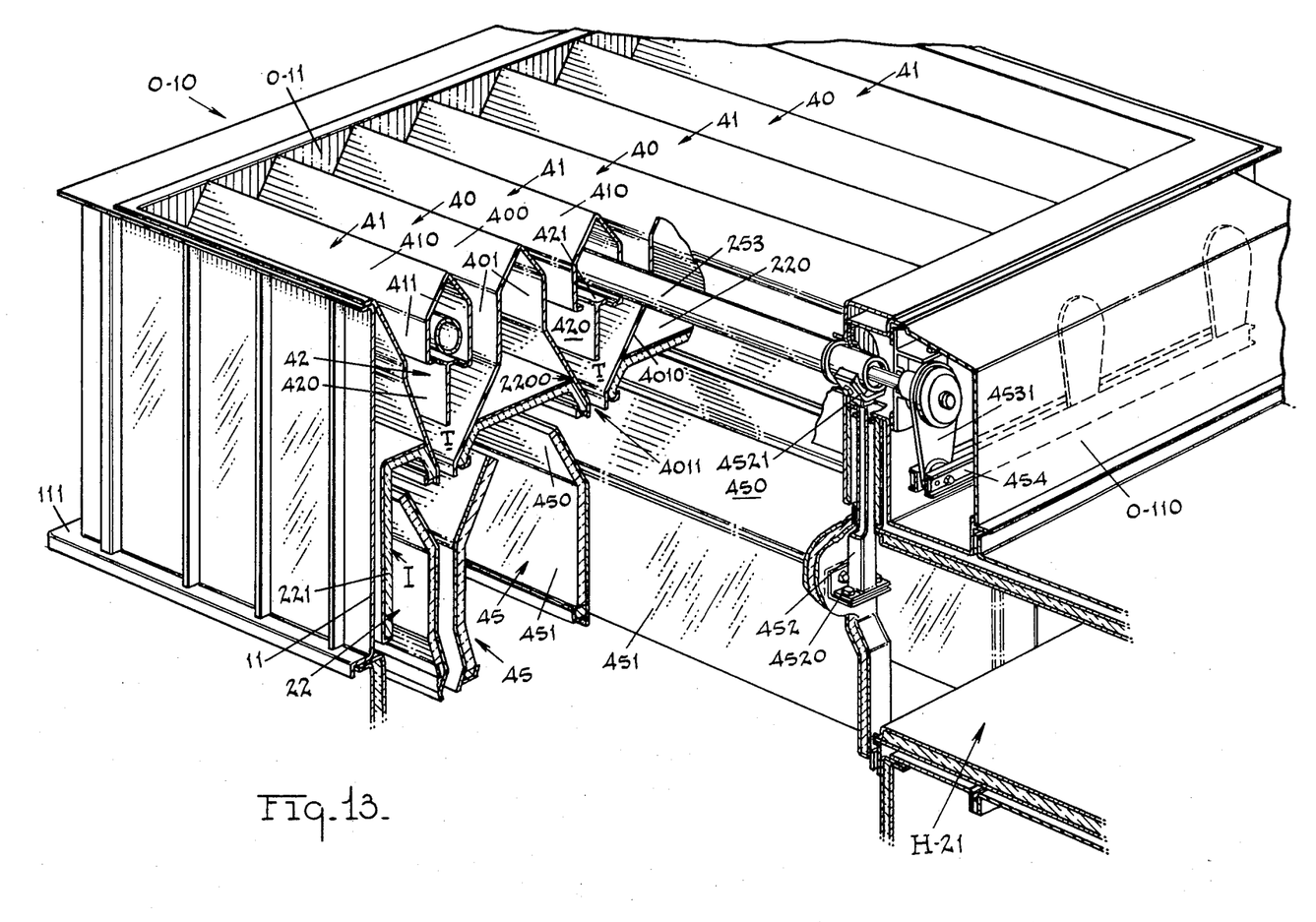
FIG. 13 illustrates a perspective view, parts being shown broken away and in section, of the apparatus shown in FIGS. 7 and 12.
Figure 14:
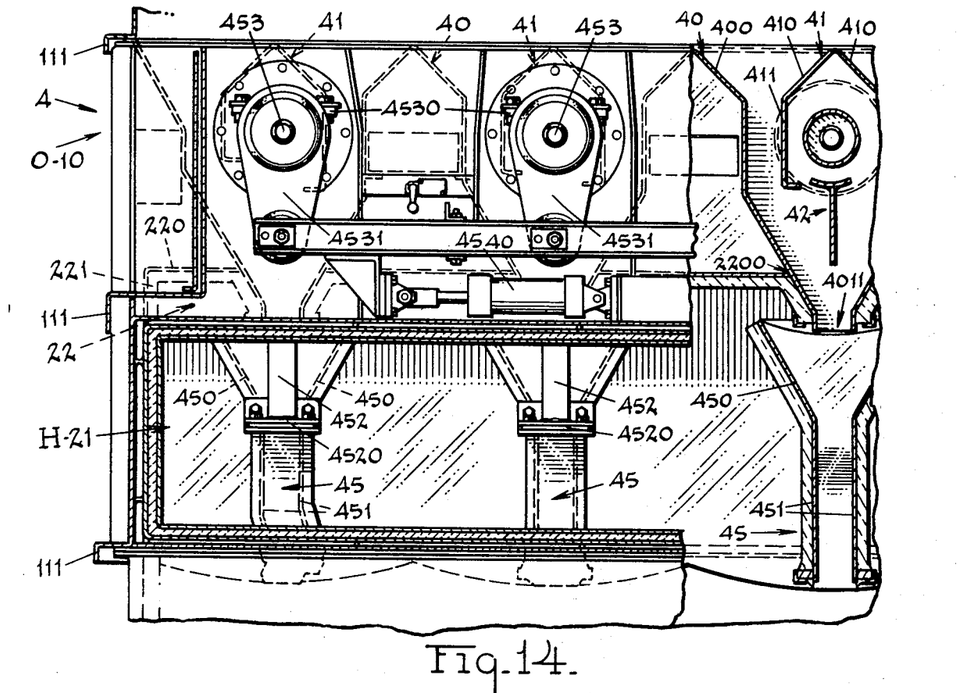
FIG. 14 illustrates a view of a section taken along the plane of the line 14—14 indicated in FIG. 7.
Figure 15:
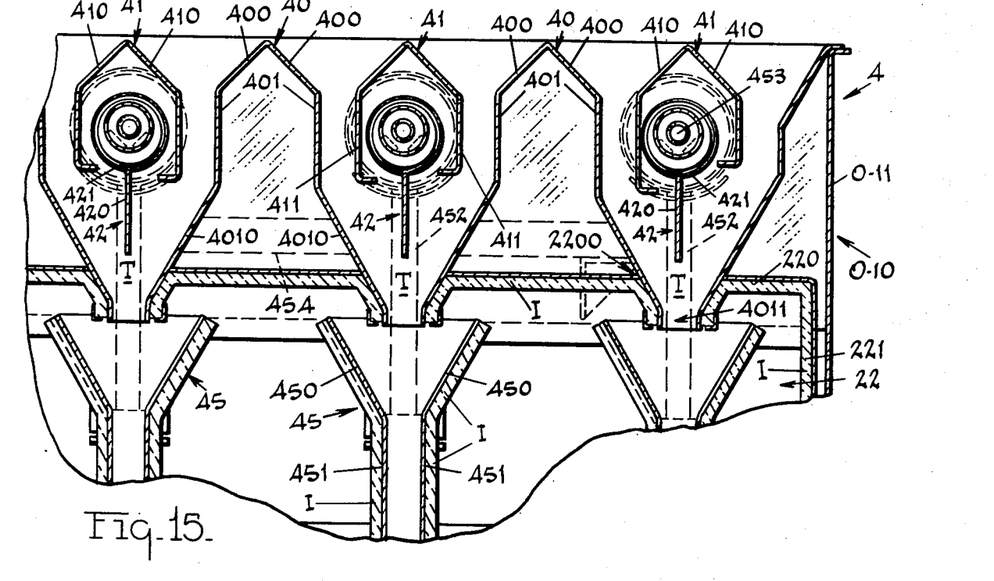
FIG. 15 illustrates a view of a section taken along the plane of the line 15—15 indicated in FIG. 7.

Turning now to specific structures within the tower connected to and associated with the flues 21, it will be seen best in FIGS. 12 and 13 of the accompanying drawings, that flue H–21 communicates with an open bottom bonnet 22 within the tower, particularly within module 0–10 thereof. The bonnet 22 has a laterally extending top wall 220 whose outline and dimensions are such as to extend substantially entirely across the tower space defined within the module 0–10. Skirt-like side walls 221 depend from the edges of the top wall 220 so that the bonnet 22, in a sense, nests, rather snugly, within the module 0–10, being suitably supported in such position, as by means shown in 2210. If desired, the top and skirt walls of the bonnet 22 may be provided, as shown, with suitable thermal insulation I to thus not only substantially divide the space S in the tower 1, above and below the bonnet 22, structurally, but also thermally.

It will be seen, therefore, that the hot gaseous medium (air) conveyed from the engine/pump house 20 through flue H–21 to the tower 1 is released into the bonnet 22. The rise of such heated gas is restrained by the bonnet walls. As the pressure of gas increases in the bonnet 22 and the input of gas, delivered by the flue H–21 continues, the gas seeks relief by a downward movement in the tower 1.

In this arrangement — namely, in one in which the heated gaseous medium introduced into the tower space S is accomplished through an open bottom bonnet, like that shown at 22, an embodiment of my invention differs importantly from the prior art structures. For example, both Graham and Reynolds, in patents heretofore mentioned, teach that the heated gaseous medium enters the garner through a battery of ducts, arranged as a grid across the span of the garner space. One or more of the walls in such prior art ducts contain a plurality of perforations through which the hot gaseous medium enters the garner space and usually, at the same time, the garnered material being treated or dried.

By this arrangement, my predecessors in this art divide the hot gaseous medium into a plurality of separate jet streams of hot gas that impinge on some particles of the material being treated or dried (those close to the perforations) more than on others (more remote) particles of such material. This causes some particles to be over-treated or dried, while others pass by under-treated or dried. In contrast, an embodiment of my invention by the use of the heat bonnet, like the bonnet 22, generates an atmosphere, without any turbulence or jet stream action, and extends that atmosphere across the entire material occupying area of the tower space. Thus, the exposure between material particles and gaseous medium in an embodiment of my invention is uniform and the drying treatment is applied evenly to all particles.

To aid and assist the desired downward flow of the atmosphere of the heated gaseous medium from under the bonnet 22, the heretofore mentioned return flue HS–21 connects with a battery of ducts 23 located in the tower 1, particularly in module D–10 thereof, and thus are in spaced relation from and below the module 0–10.

Each duct 23 is preferably formed of sheet metal and has a peaked, upward-pointing, gable hood 230. Each duct spans the space defined within the module D–10 and is disposed in laterally spaced, parallel relation to the next adjacent duct 23. Side walls 231 extend downwardly from the edges of each hood 230 to thus complete the duct and define a duct space 233 therewithin. The space 233, in each of all the ducts 23, communicates, through a header 234, with the spent gas return flue HS–21. That the gaseous medium from the bonnet 22 may, after passing through the tower, enter the space 233, each duct 23 has an open bottom, as shown at 232, to allow the passage of gas from within the tower 1 to within the spaces 233.

Thus, the ducts 23, by their arrangement in a battery, form a filter grid, extending laterally and across the space S. Such grid of ducts 23 operate to exhaust the spent gaseous medium from within the entire span of the tower 1 below the bonnet 22, without serious interference with whatever particulate material as may be moving through the tower for treatment or drying.

When grain is the material being treated or dried, it becomes important that the thermal differential between the grain and the atmosphere to which the grain is exposed, after being subjected to the hot drying gaseous medium in the "Drying Zone," be of but a slight magnitude. Otherwise, the grain reacts to any sudden change by differential contraction and expansion of its ingredients causing fracture. Fracturing the grain allows the escape of kernel ingredients and can result in a substantial loss in grain value. To prevent this, I contemplate that the heretofore mentioned flue 21 connect with a register 24 within the module B–10 shown in FIGS. 1 and 11 of the accompanying drawings.

The register 24 is a hollow sheet metal body of an inverted fish tail or fan outline, substantially spanning the cross dimension of the module B–10, particularly, the hopper portion thereof. The register 24 has open top and bottom edges 245 through which cool air, transmitted by the flue K-21, enters the tower space S. As before mentioned, the cool air moves upwardly, as in a stack, through the tower, to a grid of ducts 25 shown best in FIGS. 1, 2 and 9 of the accompanying drawings.

Figures 8, 9:
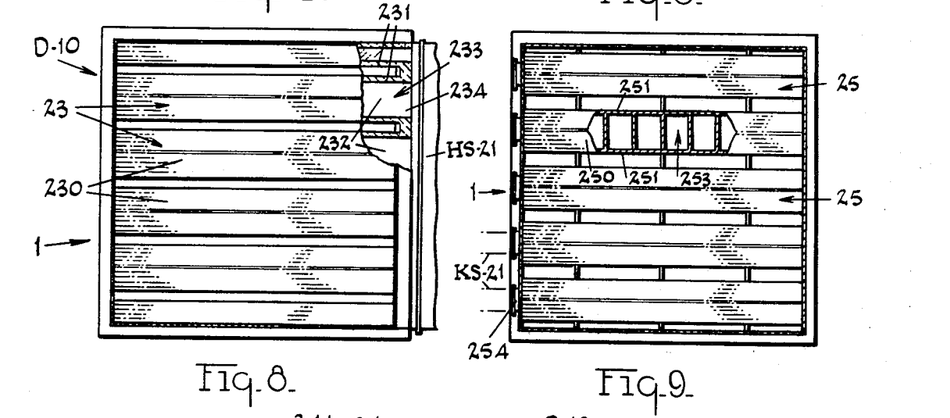
FIG. 8 illustrates a view of a section taken along the plane of the line 8—8 indicated in FIG. 1.
FIG. 9 illustrates a view of a section taken along the plane of the line 9—9 indicated in FIG. 1.
Figure 10:
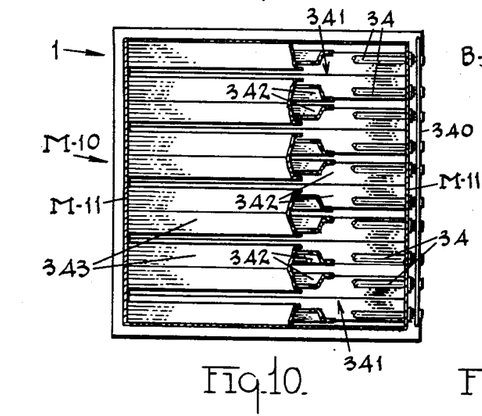
FIG. 10 illustrates a view of a section taken along the plane of the line 10—10 indicated in FIG. 1.

Each duct 25 is formed of sheet metal to have a gabled hood or top 250. Side walls 251 depend from each edge of the hood 250 to define a conduit space 253. Communication with space 253 is had through the open bottom of each duct 25 and through a header 254. The header 254 connects with the heretofore mentioned exhaust flue KS-21. Thus, spent cool air, rising through the tower space S from the register 24 enters and is directed by the ducts 25 outwardly from the tower. The tower space between the register 24 and ducts 25 forms a "Cooling Zone" in which material descending from the "Drying Zone" is gradually cooled through exchange of heat with the cool gases or airs passing upwardly through such "Cooling Zone."

Preferably, the disposition of the cool gas or air withdrawal ducts 25 is such, with reference to the ducts 23 at which the heated gaseous medium is withdrawn, that there is substantial tower space between them. By this provision, the material being treated or dried may, after it leaves the "Drying Zone," be allowed to advantageously dwell, thermally speaking, in such space. Hence, I call the space "Steep Zone B," in contemplation that the material has there a place in which a period of rest from thermal stress and an opportunity to arrive at thermal homogeniety, before cooling begins. With passage around and beneath the ducts 25, the material enters the "Cooling Zone" and the heretofore described cooling is initiated.

For the reasons, already mentioned, that equipment of the nature being here discussed should avoid, where possible, sudden changes in thermal differential between the material being treated or dried and the treating or drying medium, preheating of the material, in contemplation of its entry into the "Drying Zone," is desirable. To that end, I propose to utilize the spent drying gaseous medium from the "Drying Zone" to produce a material "Preheating Zone." See FIG. 3 of the accompanying drawings.

To accomplish this, the spent heated gas (air) returning from the tower 1 from the "Drying Zone" passes through flue HS-21 to be gathered in the engine/pump house 20 (as by an air pump, not shown). Such gathered spent gas is then directed through flue P-21 to the tower 1. The flue P-21 communicates through a header 264 with each of a plurality of sheet metal, open-bottom ducts 26 within the tower 1, particularly, within module P-10 thereof. The ducts 26 (see FIGS. 1, 2 and 5 of the drawings) span the tower space S and are disposed in spaced parallel relation to each other to form a grid. Each duct 26 besides having an open bottom 262 has an upper slot opening 265 through both of which the spent heated gas delivered to each duct 26 by flue P-21 enters the tower. A hood 260 mounted on each duct 26 above the slot opening 265 shields the slot opening and may, by being adjustably positioned vertically relative to such opening 265, operate as a damper to control the outward flow of gas through the opening 265.

The spent gaseous medium entering the tower 1 through the ducts 26 flows, in response to the stack effect, upwardly in the tower to a battery of exhauster ducts 27. The ducts 27 are sheet metal bodies having open bottoms 272 and are preferably arranged as a grid extending across the tower space S, in a plane above the location of the ducts 26. The exhaust ducts 27 communicate with the header 274 which in turn communicates with an exhaust stack or flue PX-21 to atmosphere. Thus, the spent heated gaseous medium is utilized advantageously to preheat a zone in the tower 1 above the "Drying Zone" and thereby to raise the temperature of the material about to be treated or dried.

By arranging to generate such preheat zone well above the bonnet 22 and the "Drying Zone," a tower space is allocated in which the material being dried or treated may, in passing therethrough, be caused to advantageously "dwell," thermally speaking, for a time. I call this space "Steep Zone A." During such so-called steeping, time is allowed for a gradual and thorough rise in temperature of the mass and each particle (grain) body. The material bodies are thus prepared, thermally speaking, for temperatures to which they are later exposed in the "Drying Zone." Consequently, operation in the "Drying Zone" may be safely conducted with a gaseous medium at higher temperature and lower humidity than otherwise and the resultant product will be acceptably drier than produced in structures of the prior art.

Material to be dried and treated in the mentioned tower zones is brought to the tower 1 and discharged and carried away therefrom by the material handling means 3.

THE MATERIAL HANDLING MEANS

The elements which comprise the material handling means 3 are best shown in FIG. 1 and 2 of the accompanying drawings. They include an "in-conveyor" 30, metering rolls 34, and an "away conveyor" 38.

The in-conveyor 30 includes a feed tube 301 extending from some source (not shown) of particulate material to be dried or treated to the tower 1 and particularly the inlet opening C-121 in the tower cap module C-10. Within the tube 301, a feed screw 302 is rotatably mounted and adapted, in a manner well known in the art, to move material along the tube 301 through the opening C-121 into the tower 1. The feed screw 302 may be power operated as by a motor (not shown) controlled by some suitable device, such as a suitable sensor pendulum 303. The sensor 303 may be located in the module C-10 and suspended from the wall C-12 thereof. The sensor has a web-foot 3030 which, as material delivered to the tower 1 by the conveyor 30 piles up, is engaged by the material and caused to move. Such material induced movement of the sensor 303 actuates suitable control units (not shown) of the feed screw motor drive. Thus, the feed screw 302 may be caused to operate to feed fresh material to the tower, only as material being dried in the tower is withdrawn therefrom.

The withdrawal of material from the tower essentially is controlled by the operation of the metering rolls 34. The rolls 34 (see FIGS. 2 and 10 of the accompanying drawing), conventional in form and operation, are located athwart the module M-10 in the lower regions of the "Cooling Zone" and just above the line of juncture of modules M-10 and B-10. The rolls 34 are journal supported in opposite side walls M-11 of the module M-10 for controlled oscillation or rotation as by a motor driven, crank connected, walking beam 340. Each of the rolls 34 extend through passages 341 formed by upper and lower strut shoes 342 that extend across the module M-10 as members of a compound grid or maze. As the material descends from the "Cooling Zone," it flows between the shoes 342 and around the metering rolls 34 in amounts determined and metered by the angular movement of such rolls in each successive unit of time. Thus, the flow may be increased or decreased through changes in the movement of the rolls 34.

To shield the rolls 34 from being smothered by the press of material descending from the "Cooling Zone," I provide cross-hoods 343 over each upper shoe 342. The hoods 343 extend, like the shoes 342, in spaced parallel relation across the module space to form a supplemental grid, adjunctive to the shoe grids, in the module M-10. Material after passing the just described grids and the metering rolls 34, will enter the module B-10 with which the conveyor 38 is associated.

The conveyor 38, like conveyor 30, has a tube 381 enclosing a screw 382. The tube 381 communicates with the opening B-121 in the hopper throat forming wall B-12 of module B-10. The screw 382 is rotatably mounted and adapted, when rotated, to move material along the tube 381. The screw 382 may be power operated by a motor (not shown) to thus convey material falling and entering the tube 381 through opening B-121. The material will then be conducted away from the tower site as to a packing or storing station.

It will be apparent that charging of the tower 1 may be accomplished by preliminary operation of the conveyor 30, while restraining the metering rolls 34. When such charging has been completed (see FIG. 3 of the accompanying drawings) the condition of being charged may then be maintained by a proper ratio in the operations of the conveyor 30 and the metering rolls 34. Suitable air lock means (well known in the art and not shown herein) may be located in the intake and outlet tubes 301 and 381, respectively, to thus prevent atmosphere from entering or gas exhausting from the tower during passage of the material in and out of same.

THE MATERIAL ORIENTATION MEANS

Attention is now specifically invited to FIG. 13 of the accompanying drawings and to the supporting and detailing views thereof shown in FIGS. 12, 14, 15 and 6 and 7. It is there that the elements of the material orientation means 4 are best shown. Such elements are, in the main, supported in the module 0-10 of the tower 1 and in operative association, as will be explained, with the bonnet 22 there disposed. Included in such orientation means 4 are members 40 and 45 for gathering particulate material within the tower 1 at a place, such as one on the upside of the bonnet 22, and conducting or conveying the gathered material in a path within the tower spaced from the tower and bonnet side walls 11 and 221 and independent, in that sense, of the tower, through the atmosphere within the bonnet and to a place of deposition as a layer in a plane on the underside of the bonnet 22.

The members 40 comprise a plurality of pairs of sheet metal bodies that extend transverse the module 0-10, with opposite ends thereof fixed to opposite side walls 0-11 of the module 0-10. The members 40 may each have a gabled top wall 400 from whose lineal side edges suitable side walls 401 depend. The members 40 are disposed in spaced parallel relation to each other to thus form a grid, transverse the path through which particulate material, moving downward through the tower 1, must flow. The member side-walls 401 of each member 40 have skirt portions 4010 that incline towards the like skirt portions 4010 of next adjacent member 40. The thus inclined skirt portions 4010 form (see FIGS. 13 and 15) an elongated trough T into which material flows and is gathered. The skirt portions 4010 of each pair of adjacent members 40 are fixed to the edges of and extend through elongated openings 2200 in the top wall 220 of the bonnet 22. The portions 4010 terminate within the bonnet 22 to provide, by their lineal edges, an elongated slot opening 4011 for the trough T through which the material gathered in each trough T may flow.

If desired, the flows of material relative the grid members 40 may be divided and thus caused to be more even. This is accomplished through the provision of auxiliary struts 41. The struts 41 may also be conveniently used to shelter certain drive counter shafting, as will be later explained. Like the members 40, the struts 41 are formed of sheet metal and extend between the module walls 0-11 in parallel spaced relation to each other and to the members 40. Specifically, each strut 41 is disposed to extend through a trough space and between the skirt portions 4010 of members 40 defining the same. Each strut has a gabled top or hood wall 410 from whose side lineal edges side walls 411 depend. The disposition of the struts is preferably such that the peak ridge lines of their tops 410 are in plane with peak ridge lines of the tops 400 of the members 40. In such disposition, the struts 41 and members 40 form a compound grid or grating that acts to even the flow of material from the tower space into the gathering troughs T. This action may be further extended by the provision of baffles 42.

The baffles 42 shown in the drawings comprise sheet metal plates, each having a fin portion 420 and spine portion 421. The baffles 42 extend between the module walls 0-11 in parallel relation to each other and to and directly under struts 41. Specifically, the baffles 42 are disposed so that the fin portion 420 of each of them extends along a vertical plane, substantially medial of the width of one of the mentioned troughs T and toward the trough throat or slot opening 4011. In such disposition, the baffles 42 act further to divide and distribute the material flow more evenly around struts 41.

Having gathered the material within the tower space S into the trough T formed by the members 40 and allowed the material to pass through the openings 4011, the material immediately enters the domain of one of a plurality of movable sweeps 45. These, best shown in FIGS. 13 and 15 of the accompanying drawings, comprise sheet metal bodies each having an elongate chute box or funnel portion 450 and a thereto connected elongate spout portion 451. Preferably, the walls of the funnel 450 and spout 451 portions are insulated thermally, as by insulation I, for reasons to become later apparent.

The sweeps 45 are supported, as a battery, for oscillatory movement within the space defined by the walls of the bonnet 22. As shown in FIG. 12 of the accompanying drawings, each sweep 45 is suitably engaged, as at 4520, by straps 452 that extend through gland-guarded slot openings 2201 in the bonnet wall 220. Each strap 452 has a yoke end 4521, suitably affixed to a rock shaft 453, extending through the module side walls 0–11 and conveniently housed within the walls 410 and 411 of the struts 41. Suitable bearings 4530, mounted exteriorly of and on the module side walls 0–11, provide journal support for the shafts 453. The bearings 4530 and shaft ends may be enclosed in jack house extensions 0–110 of the module side walls 0–11.

Each rock shaft 453 is connected to some suitable common source of power that, on actuation, causes all the shafts and the sweeps 45 connected thereto to swing and move in unison. Preferably, for that purpose, each rock shaft 453 has a bell crank 4531 (see FIG. 14 of the accompanying drawing) which is operatively connected to a walking beam 454. The beam 454 may be caused to reciprocate lineally, as by a suitable reciprocatory motor 4540 mounted, for example, on the module 0–10. Now, as the motor 4540 is activated, it will reciprocate the beam 454 causing, through the bell crank 4531, the sweeps 45, particularly the spout portions 451 thereof to move in reciprocatory arcs within the bonnet 22.

The particulate material from the material gathering troughs T will thus flow in paths within the bonnet 22, through the cradle sweeps 45. Thus, the particulate material returns to the tower space S as slightly arcing, basically horizontal extending layers having an aggregate area equal to that of the cross-sectional area of the tower space S. In a very real sense, the lips or lower edges of each cradle sweep supported spout 451 movably engage and move the particulate material, much in the manner that a "float" in the plaster art engages and distributes the plaster over a wall. Such action generates, through the described particle engagement and movement, a superficies surface area of a predetermined, in this instance, basically horizontal, contour, uppermost of the particulate material gathered in the tower 1 below the sweeps 45. This is in marked contrast to the haphazard piling of particulate material taking place in the apparatus shown in the hereinbefore mentioned Oholm patent. There, the free falling particulate material, entering the Oholm patent tower, produces a superficies surface area of varying conical outline, peaking along the tower longitudinal axis at altitudes, sometimes high and other times low, depending on a number of unpredictable factors.

As diagrammatically shown in FIG. 16 of the accompanying drawings, in each successive sweeping stroke of each cradle 45, in the continued reciprocation thereof, successive and overlaying layers $c$, $b$ and $a$ of material, each having an upper surface of predetermined contour, will be emitted from the spout 451 of each cradle sweep 45 and will be layed upon and over the previously delivered layer. Continued operation in this manner results in a succession of over-layed layers of such material and the generation of a downward flowing "bed" of particulate material beneath the sweeps 45. Within the bed (see FIG. 3 of the accompanying drawings) the material will be in and pass downwardly through the "Drying Zone," "Steep Zone B" and finally the "Cooling Zone" in the drying operation.

OPERATION

In the preceding description of certain parts and combinations, individual operation thereof has been often described. It is now my purpose to combine such description, sometimes by reference and at others more in detail, to provide an outline of a full program of apparatus performance. The tower 1, of course, must be first charged with the particulate material whose treatment or drying is to be accomplished. In such first charging, the material used may be that which, by virtue of previous treatments, has been dried or may be raw undried material which, having served a charging purpose, would need to be later recycled through the tower to produce acceptably dried material.

Charging may be accomplished by operation of the in-conveyor 30, which brings raw particulate material, such as grain, from some source of such to the tower inlet opening C–121. The grain material, thus delivered, falls, by gravity, through the opening and into an upper charging section of the vertical tower space S. The upper charging section of the tower is substantially defined by horizontally extending structures related to member 40. In the upper charging section, are included the "Preheating Zone" and "Steep Zone A," wherein treatments of that nature take place.

Passing between and around ducts 27 and 26 in the upper charging section and into the troughs T of structures related to the members 40, the gravitating grain enters the cradle sweeps 45. During charging, the material, passing through the troughs T and cradle sweeps 45, enters a container section of the tower. The container section is substantially defined, at its upper end, by the horizontally extending structures related to members 40 and, at its lower end, by the horizontally extending structures related to the metering rolls 34 and includes the "Orientation Zone," "Drying Zone," "Steep Zone B" and "Cooling Zone" wherein treatments of that nature take place.

The particulate grain material, entering and passing through the tower container section, gravitates between and around the ducts 23 and 25 in the container section until it engages structures related to the metering rolls 34. By retaining the power driven metering rolls against movement, at this time and until the charging is complete, the grain accumulates and occupies the lower part of the tower section.

In the course of such accumulating, the particulate material piles higher and higher to form a "bed." When the bed reaches a certain depth, the material, which forms it, surrounds and thus chokes off the spouts 451 of the cradle sweeps 45. For the time being, this blocks further material flow through the spouts 451 and thus assures that only a predetermined limited quantity of particulate material will, at one time, be lodged in the tower space container section. This quantity is, by design, only that which will just occupy the lower part of the container section of the tower. Thus, the upper part of such container section is preserved as a void space in which there will be no accumulation of particulate material therein. Such void space is substantially enclosed, in the illustrated structure, by the bonnet 22 and has, as one of its boundaries, an upper peripheral or superficies area of the bed. The void space is usefully employed, as will be later explained, in bringing a drying gaseous medium, such as heated air, into ambient and atmosphere-like contact with the particulate material of the bed.

As charging of the tower 1 continues from this point, the grain material will now begin to accumulate in the upper charge section of the tower space S. When the accumulating material reaches a predetermined height in the tower charging section, material of the pile will displace the sensor 303, causing deactivation of the in-conveyor 30 and discontinuance of the material inflow.

At this stage, the tower, being charged, is postured to begin the material drying operation. Such condition is illustrated diagrammatically in FIG. 3 of the accompanying drawings. It will be there seen that the quantity flow of particulate material through the tower is regulated by the metering rolls 34. As the rolls 34 rotate, particulate material from the bottom of the bed will pass into the outlet discharge section of the tower 1 below the metering rolls. From this point, the away-conveyor 38 passes the material to the site of a bagging, storage or similar operation.

The withdrawal of material from the bed, through passage around the metering rolls 34, allows the bed to settle in the tower 1, freeing the blocked spouts 451 of the cradle sweeps 45 so that material may again pass through the member 45 into the tower container section. Flow of material through the member 45 continues until such spouts are again blocked. This allows the material in the tower charging section to settle, freeing the sensor 303 and activating the in-conveyor 30. As the sufficient material accumulates in the tower charging section, due to the in-conveyor action, the sensor 303 will be again displaced to deactivate the in-conveyor.

In normal operation, the movement of the particulate material to and through the various sections and zones in the tower space S is substantially continuous and coincidental. The cradle sweep motor 4540 and the power means adapted to drive the conveyors 30 and 38 are synchronized with the action of the metering rolls to produce a substantially smooth flow of material. The selected rate of flow is related to the condition of the raw material entering the tower and the desired condition of dryness in the treated material leaving the tower. The rate of material flow selected will also compensate for the diminishing displacement of the material, in yielding moisture, as it passes through the tower. Thus, by individual adjustments in the rates by which material is brought to the tower and passed through the sections thereof, the charge in the various tower sections, though constantly changing in content identity, may be maintained quantitatively constant.

Charging of the tower having been accomplished, the gas pumping and heating machinery in the engine pump house 20 may be activated. Such machinery, as is well known, has the capability of withdrawing, drying and heating air, from an atmosphere source thereof. In the structure being described, the heated drying air is conducted through the flue H-21 to within the mentioned void space in the upper part of the tower container section and below the bonnet 22.

The tendency of the introduced heated drying air to rise in the tower is resisted by the bonnet walls 220 and 221 and by generating a negative gas pressure within the bed of particulate material. Such negative pressure is generated by the mentioned pumping machinery and is communicated through flue HS-21 and ducts 23 to the tower container section and to a place therein below the bonnet and within the bed.

Those skilled in the art will at once remark that the heated drying air will thus enter the bed of particulate material being dried more as an atmosphere and if along streams or paths at all, along paths that are contiguous to one another throughout their lengths and in the totality of their cross-dimensions are equal to the cross-sectional area of the bed. The draft of heated drying air expands and flows downwardly from the void space in the tower container section through the superficies area of the bed comprising the upper inflowing end of such bed and into the bed.

Coincidentally, due to the concurrent operation of the metering rolls 34, the particulate material, comprising the bed, moves downwardly. Such downward movement of the particulate material occurs along the mentioned paths through which the heated drying air may be said to move. Thus, the particulate material and the heated drying air moves, in common, along identical paths, to points within the bed at which the temperatures of the particulate material in the path and the heated drying air at that place are nearly equal.

While this is taking place, the spout 451 of each of the sweeps 45, being free to discharge material from the tower charging section, does so. The sweeps, responding to the urging of motor 4540 which drives them, move, as a battery, in relatively short, reciprocative, oscillatory strokes. Thus, in each stroke, a layer of material from the tower charging section will be discharged from the spout 451 of each cradle sweep. Each layer, thus discharged, will extend, like a strip, over a part of what was, before the layer is laid, a superficies area or upper end of the bed. Each of the several layers concurrently laid in one common stroke of the battery of cradle sweeps 45 will, when the laying thereof is complete, adjoin each other to form a continuous layer extending across the entire cross-sectional area of the tower interior. This composite layer, being sufficient to do so, blankets the entire upper superficies area or end of the bed. In effect, the layers, in their extent and relation to the bed, provide the bed with a fresh superficies area or upper end surface of a predetermined basically horizontal contour.

Successive strokes of the battery of sweeps 45, will produce successive plurality of layers in the same described side-by-side registration, as before, but now overlaying the previously deposited layers. This successive layering or laminating phenomena is diagrammatically illustrated in FIG. 16 of the accompanying drawings by the relation of layers a, b and c there shown.

Those skilled in the art will also note that, in adding material to be dried to the material in the course of drying and in the bed, provision is thus made that the added material is both oriented and controllably presented to the material already in the course of drying and in the bed. By such orientation and controlled charging of the bed and addition to the material in the course of drying, I can control the period of time during which the material making up the superficies area or upper end surface of the bed is exposed to the heated drying air being introduced to the mentioned void space below the bonnet 22.

For example, if it be desirable to extend the period of exposure, as when the gaseous medium in use is of low temperature or when the material being dried is of high heat tolerance or extraordinary "wet," the rate at which the sweeps are reciprocated may be cut back. This will allow a longer time to elapse between the laying of each successive layer. On the other hand, when it becomes desirable to shorten the period, as should the gaseous medium in use be of a high temperature or the material being dried of low heat tolerance or already nearly dry, the tempo of sweep reciprocation may be increased. It will be obvious that the elapsed time between laying successive layers will then be decreased.

Also by controlling the material being added to the bed, I am enabled to place each added portion of material in approximately the same position within the tower and relative to the atmosphere of drying gaseous medium as that in which each previously added portion was placed. This results in a more nearly uniform treatment of all portions of added material and an end product of a fairly constant characteristic.

The spent atmosphere of heated drying gaseous medium withdrawn from the tower 1 through the flue HS-21 is, as was previously suggested, advantageously used to preheat material in the charging section of the tower. To that end, the flue HS-21 connects to flue P-21 and ducts 26. The residual heat in the gaseous medium passes to the material, as the gas flows upwardly (see FIG. 3 of the drawings) from ducts 26 to ducts 27 and the material moves downwardly through the "Preheating Zone" of the tower.

I have found that dryer capacity and efficiency and grain quality are all enhanced, if the grain has been subjected to preheating, as in a "Preheating Zone" described. This is particularly so, when that grain is allowed to dwell for a time, after preheating, in a steeping zone, like "Steep Zone A."

The passage of material through the "Orientation Zone" into the bed and through the "Drying Zone" has been discussed. From the "Drying Zone," I contemplate that the material, particularly when it is grain, will enter and pass through a second steeping zone, like "Steep Zone B." Here (see FIG. 3 of the drawings) the grain is "held" or thermally "dwells" at the elevated temperatures produced in the bed and "Drying Zone." Due to the withdrawal of gaseous medium by ducts 23 and 25 on either side of the "Steep Zone B," this zone has some of the characteristics of an air lock or "dead space." Corn, if it be the grain being dried, will be caused to advantageously "sweat" and yield its interior moisture in such a zone. Also, in this zone a desirable "gluing" of residual dust, "beeswing," et cetera occurs. Otherwise, these particles might enter and pollute the tower exhaust.

Passing from the "Steep Zone B," the material enters the "Cooling Zone" and is influenced by conditions generated therein. Cooling gas enters the zone from register 24 and passes up between the metering rolls 34, through the material moving toward such rolls. The spent cooling gas exhausts to the atmosphere through the ducts 25. In accordance with well understood practices, the material is thus returned or, in a sense, lehred back to ambient temperatures in a condition, so far as concerns heat produced stress, resistant to fracture.

I have observed, in operating an embodiment of my invention, that it is desirable to provide some means by which the tower walls of the module D-10 in the vicinity of the "Drying Zone" are prevented from transmitting the heat induced therein to the particulate material. The upper end inner surfaces of these walls, being directly exposed to the heated gaseous medium emanating from the bonnet 22, can become hotter than desirable to the particulate material. This heat, unless dissipated or its conduction restricted, can be conducted to the portions of the module walls in contact with the particulate material of the bed. Various means, such as insulating air curtains or a water tube cooling jacket to dissipate the heat, may be provided or, if desired, the module wall may be itself constructed of some thermally non-conductive material. Such expediencies are well known in the art and hence are not shown in the drawings.

I claim:

1. In a particulate material drying apparatus having a tower; a source of supply of a gaseous medium; conduit means in communication with the source of supply of gaseous medium and a zone within the tower for conducting gaseous medium to within the tower and the tower having an opening above the mentioned tower zone and through which opening particulate material to be dried may, in response to gravity, enter the tower and pass therethrough, the provision of movable means, in engagement with the tower and within the mentioned tower zone, operable, when moved, to movably engage and move particles of particulate material within the mentioned tower zone into positions wherein the mentioned particles of particulate material define, by the relation of each to the other, a superficies surface are of predetermined contour, uppermost of the particulate material below and adjacent to the mentioned tower zone;

a source of power and means operatively connected to the source of power and the movable means for moving the same.

2. In a particulate material drying apparatus, as described in claim 1, in which the mentioned movable means is in engagement with the tower and is actuated by the mentioned source of power as to movably engage and move the particles of the particulate material, within the mentioned tower zone, into position wherein the mentioned particles of particulate material define, by the relation of each to the other, a superficies surface area extending substantially in a plane normal to the major longitudinal axis of the tower, uppermost and across the particulate material below and adjacent to the mentioned zone.

3. In a particulate material drying apparatus, as described in claim 1, in which the superficies surface area, generated by movement of the particles of particulate material by and in consequence of movement of the mentioned movable means, is substantially of horizontal extension.

4. In a particulate material drying apparatus, as described in claim 1, in which the mentioned movable means includes an elongated sweep extending normal to the major longitudinal axis of the tower and across the mentioned tower zone and a supporting unit in engagement with the sweep and tower for supporting the sweep for movement relative to the tower and within the mentioned tower zone in a plane substantially parallel to the extension of the sweep.

5. In a particulate material drying apparatus, as described in claim 1, in which the mentioned movable means includes an elongated sweep extending normal to the major longitudinal axis of the tower and across the mentioned tower zone, a rock shaft in journal engagement with the tower, and a strap in engagement with the sweep and with the rock shaft whereby the sweep is supported for orbital movement with reference to an axis coincident with that of the rock shaft journal.

6. In a particulate material drying apparatus, as described in claim 4, in which the mentioned source of power comprises a motor in engagement with the tower and the mentioned means operatively connected to the source of power and the movable means for moving the same includes a walking beam supported on the tower for lineal movement relative thereto and in operative connection with and movable by the motor and a bell crank keyed to the rock shaft and in pivotal engagement with the walking beam whereby movement of the walking beam is transmitted to the rock shaft and to cause the sweep to move orbitally.

7. In a particulate material drying apparatus, as described in claim 1, in which the means operatively connected to the source of power and to the mentioned movable means is adapted, when actuated, to move the movable means in successive alternative directions athwart the major longitudinal axis of the tower.

8. In a particulate material drying apparatus, as described in claim 6, in which the mentioned motor has a reciprocatory stroke whereby the walking beam is reciprocably moved and the sweep is oscillated orbitally about an axis coincident with that of the rock shaft journal.

9. In a particulate material drying apparatus, as described in claim 1, in which the mentioned movable means includes a plurality of individual parts, each in engagement with the tower and within the mentioned tower zone, and each operable, when moved, to movably engage and move certain portions of particles of the particulate material, within the mentioned tower zone into position wherein each portion of the mentioned particles of particulate material define, by relation to each other, a plurality of laterally registering strips that in composite constitute a superficies surface area of predetermined contour, uppermost and across the particulate material below and adjacent to the mentioned tower zone.

10. In a particulate material drying apparatus, as described in claim 9, in which the means operatively connected to the source of power and to the individual movable means parts is adapted for moving the parts in unison and common direction relative to the major longitudinal axis of the tower.

11. In a particulate material drying apparatus, as described in claim 10, in which the means operatively connected to the source of power and to the individual movable means parts is adapted for moving the parts back and forth across the major longitudinal axis of the tower.

12. In a particulate material drying apparatus, as described in claim 9, in which each of the mentioned parts comprises an elongated sweep extending in spaced parallel relation to each other and normal to the major longitudinal axis of the tower across the mentioned tower zone.

13. In a particulate material drying apparatus, as described in claim 12, in which the mentioned movable means includes a supporting unit in engagement with each of the plurality of sweep parts for supporting the same for movement relative to the tower and within the mentioned tower zone all in a plane substantially parallel to the extension of the sweep parts.

14. In a particulate material drying apparatus, as described in claim 13, in which the mentioned source of power comprises a reciprocatory motor in engagement with the tower and the mentioned means operatively connected to the source of power and movable means for moving the same comprises a walking beam supported on the tower for reciprocatory lineal movement relative thereto, a plurality of bell cranks, a plurality of rock shafts journal supported on the tower, each bell crank keyed to a rock shaft and in pivotal engagewith the walking beam, and the mentioned supporting unit comprises a plurality of pairs of straps, each pair of straps in engagement with a sweep and with a rock shaft whereby reciprocation of the motor causes oscillation of the sweeps in unison and common direction, each in an orbital path about the axis of the rock shaft to which the sweep is strap connected.

15. In a particulate material drying apparatus, as described in claim 1, having the additional provision of a conduit element in engagement with the tower and extending at least in part into the tower zone and adapted to convey particulate material into the mentioned tower zone to be engaged and moved by the mentioned movable means, as aforesaid.

16. In a particulate material drying apparatus, as described in claim 15, in which the conduit element comprises a component of the movable means and is adapted to move therewith.

17. In a particulate material drying apparatus, as described in claim 15, in which the conduit element includes a particulate material gathering part within the tower above the mentioned tower zone, a particulate material enclosing and conducting part within the mentioned tower zone and in communication with the mentioned gathering part and a particulate material discharging part proximate the lowermost boundary of the mentioned tower zone and in communication with the mentioned particulate material enclosing and conducting part.

18. In a particulate material drying apparatus, as described in claim 17, in which the mentioned gathering part includes a grate-like unit in engagement with and within the tower and extending transverse thereto in a plane between the tower opening and the mentioned tower zone;

the grate-like unit having a plurality of elongated parallel extending troughs adapted to gather particulate material within the tower as it passes from the opening toward a space below the mentioned tower zone and to deliver the gathered particulate material to the mentioned particulate material enclosing and conducting part.

19. In a particulate material drying apparatus, as described in claim 17, in which the mentioned particulate material enclosing and conducting part includes a tubular unit in communication with the mentioned particulate gathering part and extending at least in part through the mentioned tower zone toward the lowermost boundary thereof.

20. In a particulate material drying apparatus, as described in claim 18, in which the mentioned particulate material enclosing and conducting part includes a tubular unit in communication with the trough of the mentioned grate-like unit of the particulate material gathering part and extending vertically through the tower toward a space therein below the mentioned tower zone and adapted to receive and enclose particulate material from the trough and conduct the same, while so enclosed, downwardly through the mentioned tower zone.

21. In a particulate material drying apparatus, as described in claim 20, in which the mentioned tubular unit is integrated and movable with the mentioned movable means for movably engaging and moving particles of particulate material into a relation of a superficies surface area, as aforesaid.

22. In a particulate material drying apparatus, as described in claim 20, in which the tubular unit has a hollow conical upper end portion in communication with the trough.

23. In a particulate material drying apparatus, as described in claim 20, in which the particulate material discharging part comprises an orifice unit in communication with the tubular unit of the mentioned particulate material enclosing and conducting part and having a particulate material discharging opening proximate the lowermost boundary of the mentioned tower zone adapted to discharge particulate material conducted through such tower zone to a position of engageability by the mentioned movable means for engaging and moving particulate material particles into a relation of a superficies surface area, as aforesaid.

* * * * *

UNITED STATES PATENT OFFICE
CERTIFICATE OF CORRECTION

Patent No. 3,701,203　　　　　Dated October 31, 1972

Inventor(s) Robert J. Anderson

It is certified that error appears in the above-identified patent and that said Letters Patent are hereby corrected as shown below:

Column 16, line 44, "are" should read -- area --.

Signed and sealed this 3rd day of December 1974.

(SEAL)
Attest:

McCOY M. GIBSON JR.　　　　　C. MARSHALL DANN
Attesting Officer　　　　　　Commissioner of Patents